United States Patent [19]

Marchant, Jr. et al.

[11] 3,989,669

[45] Nov. 2, 1976

[54] POLYIMIDES PREPARED FROM AZO-BISANHYDRIDES OF TRIMELLITIC ANHYDRIDE

[75] Inventors: Kerford A. Marchant, Jr., Evanston; David J. Fenoglio, Carol Stream, both of Ill.

[73] Assignee: Standard Oil Company (Indiana), Chicago, Ill.

[22] Filed: Nov. 9, 1973

[21] Appl. No.: 414,351

[52] U.S. Cl. ............................ 260/47 CP; 260/75 N; 260/78 TF; 260/152
[51] Int. Cl.[2] .................. C08G 63/40; C08G 73/10
[58] Field of Search ............... 260/346.3, 47 CP, 65, 260/78 TF, 152, 75 N

[56] References Cited
UNITED STATES PATENTS

| | | | |
|---|---|---|---|
| 3,182,073 | 5/1965 | Loncrini | 260/346.3 |
| 3,440,215 | 4/1969 | Holub | 260/47 |
| 3,453,292 | 7/1969 | Izumi et al. | 260/346.3 |
| 3,526,618 | 9/1970 | Horstmann et al. | 260/152 |
| 3,632,608 | 1/1972 | Holub | 260/346.3 |

*Primary Examiner*—Lester L. Lee
*Attorney, Agent, or Firm*—Stanley M. Welsh; Arthur G. Gilkes; William T. McClain

[57] ABSTRACT

A new azo-bisanhydride made by condensing 2 moles of 4-chloroformylphthalic anhydride (4-mono acid chloride of trimellitic anhydride), 1 mole of hydrazine, and 1 mole of a ketone (acetone) having the formula:

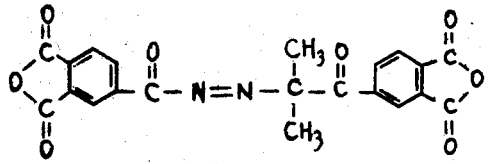

Such compounds are useful as dyes and as monomers capable of copolymerizing thus introducing the azo chromophore group into the backbone of a polymer.

3 Claims, 1 Drawing Figure

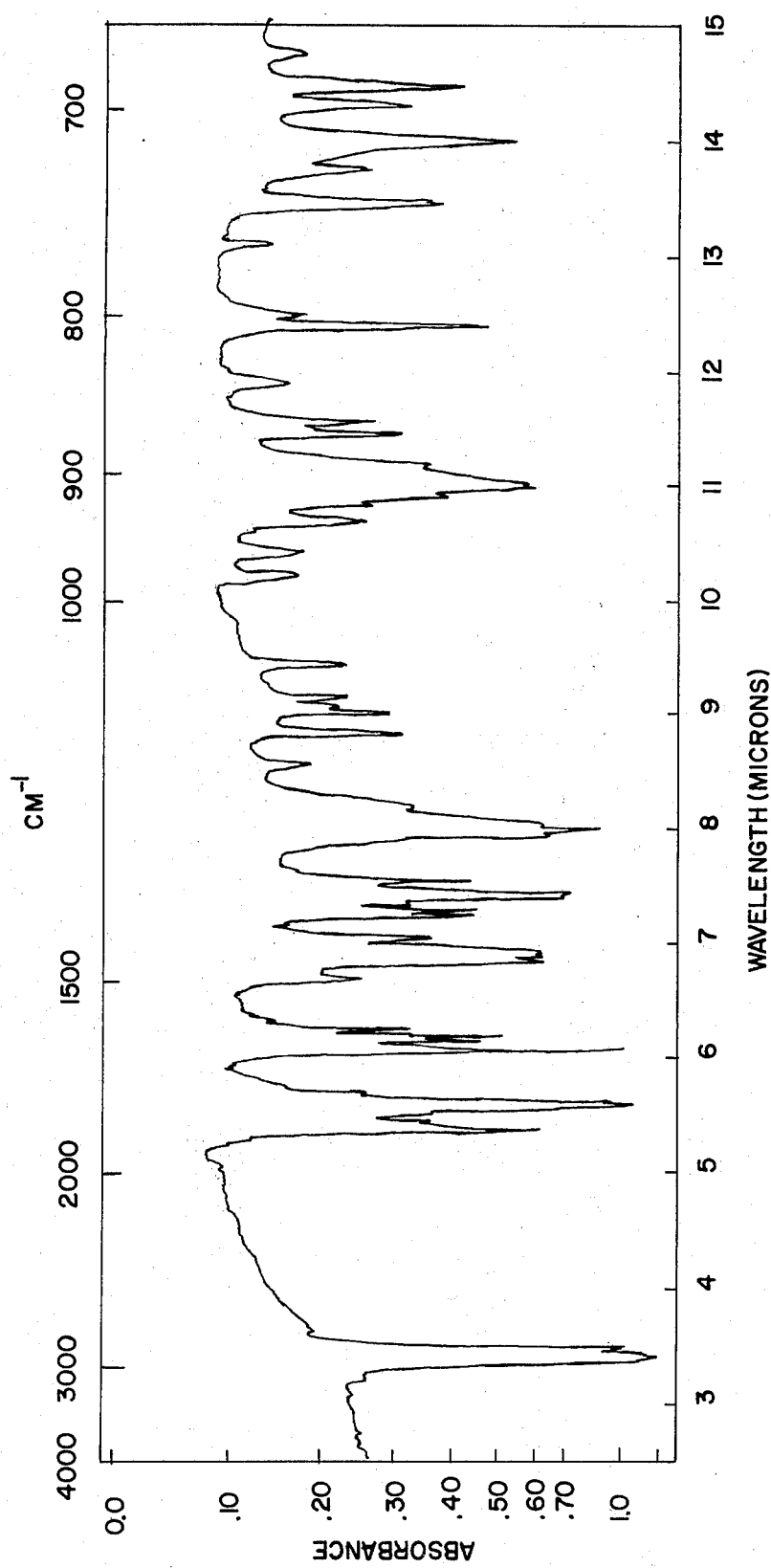

POLYIMIDES PREPARED FROM AZO-BISANHYDRIDES OF TRIMELLITIC ANHYDRIDE

BACKGROUND OF THE INVENTION

This invention relates to a new class of organic compounds and polymers derived from them. More particularly, it relates to new bisanhydrides derived from trimellitic anhydride, a method for their preparation and polymers made by copolymerizing them with diamines or diols. These compositions contain two anhydride groups, an azo (—N=N—) structure as well as a residue contributed by the organic ketone reaction medium. Specifically, our invention provides bis-anhydrides having the general formula:

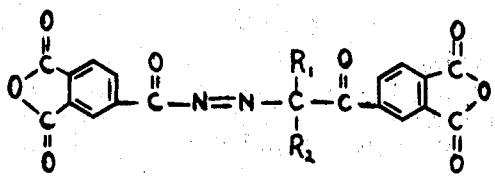

wherein $R_1$ and $R_2$ are alkyl radicals of up to 6 carbon atoms, halogenated alkyl radicals of up to 6 carbon atoms or phenyl radicals.

As a result of the existence of two reactive anhydride groups per molecule which can readily undergo reactions well known to the art, e.g. reactions with glycols, polyols, diamines, epoxides and the like, the compounds of our invention are useful in the preparation of a variety of resinous materials. They can undergo copolymerization forming such polymers as polyesters, polyamides and polyimides. Further, the presence of the azo group, a well known chromophore group, leads to a colored or dyed product. Additionally, the incorporation of the solvent molecule (ketone residue) adjacent to the azo group leads to greater selection and control of the chemical environment near the chromophore group and hence the color. These compounds are also useful in grafting on to pre-existing polymeric molecules and promoting crosslinking as well as dyeability.

DESCRIPTION OF THE INVENTION

The compounds of this invention are prepared by reacting the 4-monoacid chloride of trimellitic anhydride with hydrazine in the presence of a ketone. The overall stoichiometry involves two moles of 4-monoacid chloride condensing with one mole of hydrazine and one mole of the ketone.

The reaction can be performed in any convenient vessel including glassware, at temperatures below zero ° C, under anhydrous condition and with the use of a blanket of inert gas such as argon, neon, nitrogen and the like. The reaction conditions are chosen such that the selectivity of the trimellitate reacting at the 4-acid chloride position rather than opening the anhydride ring will be optimized. This is accomplished primarily by maintaining as low a temperature as practical during the reaction. Thus, a temperature below 0° C is required while below −20° C is even better. For the preferred acetone reaction −30° C is desirable.

A diluent or solvent is useful. Preferably an excess of the ketone reactant can serve as the solvent. Advantageously, a base is added as an HCl scavenger. Tertiary amines function well in this capacity particularly since they are chemically noncompetitive at the preferred reaction conditions of this invention. Triethylamine is preferred.

The ketones useful in this invention include the aliphatic ketones having 3 to about 13 carbon atoms, substituted derivatives of these ketones particularly the halogenated species wherein the substitution is removed at least two carbons from the carbonyl group such as 1,5-dichloro-3-pentanone as well as aromatic substituted ketones including benzophenone. Acetone is preferred.

The addition of the hydrazine to the 4-chloroformylphthalic anhydride in the presence of a ketone can best be done by slowly adding a solution of hydrazine, ketone and tertiary amine dropwise to a solution of the anhydride in excess ketone. In this manner the selectivity of the reaction at the acid chloride site will be enhanced because the reaction is exothermic and a slow dropwise addition of hydrazine promotes better temperature control. Furthermore, the preparation of a separate hydrazine, ketone and tertiary amine solution prior to the addition of 4-chloroformylphthalic anhydride is preferred in that a slight exothermic reaction is observed at this stage. One possible explanation for this is that the hydrazine and ketone react forming a hydrazone with the loss of water and it is this intermediate that actually reacts at the acid chloride. For the preferred reaction using acetone and triethyl amine, from 1 to 5 hours is usually sufficient time to react about 0.1 to 0.2 moles of 4-chloroformylphthalic anhydride.

After filtering to remove the triethylamine hydrochloride salt and vacuum evaporation of the excess ketone, a solid crystalline product is recovered. This product can be easily purified by recrystallizing in acetone. The presence of the azo chromophore group makes this crystalline solid highly colored. In the exemplified preferred specific embodiment, a yellow product is recovered.

When a solution containing a compound of this invention is placed in contact with cloth or paper a definite dying effect is observed.

The azo-bisanhydrides of this invention can be readily polymerized with diamines and diols of up to 20 carbons by methods well known and well documented in the art. The subsequently formed polyimides, polyamides, poly(amide-imides) and polyesters contain the azo group and generally retain the color characteristic of the bisanhydride. Such polymers are useful in making films, coatings, fibers, fabricated articles and the like. Similarly, the bisanhydrides can be used as crosslinking agents or in conjunction with other known diacids and dianhydrides. The presence of the azo group in both the bisanhydride and polymers suggest that they are potentially useful as free radical initiators for further free radical reactions.

The following examples illustrate the preferred specific embodiment of our invention but should not be considered unduly limiting.

EXAMPLE I

Under anhydrous condition, 29.4 g (0.140 mole) of 4-chloroformylphthalic anhydride dissolved in 500 ml of reagent grade acetone was added to a glass flask having been dried at 150° C. The addition and subsequent reaction were done under a positive argon pressure. To a pressure equalizing addition funnel mounted to the flask were added 14.5 g (0.144 mole) triethylamine, 2.02 g (0.0628 mole) hydrazine and 75 ml reagent acetone. The 4-chloroformylphthalic anhydride solution was cooled to −30° C and the hydrazine/triethylamine/acetone solution was added with stirring over a period of 95 minutes. The temperature was kept at −30±3° C during this addition. After addition the reaction mixture was allowed to stir for an additional 165 minutes. At the end of this time, the mixture was filtered and the filtrate evaporated to dryness to yield 29.8 g of acetone soluble material. Upon recrystallization from acetone a bright yellow product having a melting point of 229°–230° C was recovered. The infrared spectrum of this material is shown in FIG. 1 of the drawing.

EXAMPLE II

A three-necked, 1-liter round bottom flask was equipped with a condenser, gas inlet tube, thermometer, stirrer and dropping funnel. The apparatus was flame dried under a positive $N_2$ pressure which was maintained during the course of the reaction. About 29.4 grams (0.14 mole) of 4-chloroformylphthalic anhydride was dissolved in about 500 ml of acetone, placed in the round bottom flask and cooled to −30° C. A solution of about 20 ml (0.144 mole) triethylamine and 2.00 ml (0.0628 mole) hydrazine in about 75 ml of acetone was placed in the dropping funnel. This solution was added slowly to the 4-chloroformylphthalic anhydride solution in the flask over a period of 1.5 hours at −30° C. The reaction mixture was stirred for an additional 3 hours at this temperature and then filtered to remove the triethylamine hydrochloride precipitate. The acetone was then evaporated from the filtrate and a yellow solid product was recovered. Infrared spectrum of this product is given in FIG. 1 of the drawing.

EXAMPLE III

In a manner similar to Example II a second run was performed using 4-chloroformylphthalic anhydride which had been purified by distillation. The same yellow product was recovered and its IR spectrum was identical to the previous Example. This compound was carefully recrystallized from acetone to give square yellow transparent plates with a melting point of 238°–239° C. Elemental analysis of the compound found it to contain 59.92% carbon, 3.15% hydrogen, 6.13% nitrogen and 30.99% oxygen which was in good agreement with the theoretical values 60.06, 2.88, 6.61 and 30.45 respectively corresponding to the emperical formula $C_{21}H_{12}N_2O_8$. The 90 Mz nmr spectrum of this purified material was examined in $CH_2Cl_2$ and $CDCl_3$ and found to contain methyl and aromatic protons in a ratio of 1:1. The resonance for the methyl hydrogens was a single line confirming that all methyl groups are magnetically equivalent consistent with the formula

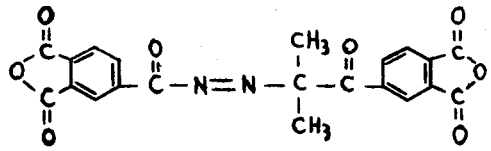

The IR spectrum supported this structure in that the anhydride carbonyl stretching bands ($\simeq 1860$ cm$^{-1}$ and $\simeq 1780$ cm$^{-1}$) were present. The mass spectrum analysis was also consistent with the azo structure.

EXAMPLE IV

A portion of the acetone and bis-anhydride solution recovered in Example II was brought in contact with white paper and cloth. Both were immediately dyed yellow. This color remained after evaporation of the acetone.

EXAMPLE V

To a 100 ml 3 neck flask equipped with a stirrer was added 20.3 ml of dimethyl acetamide and 2.002 g of 4,4'-diamino-diphenyl ether. This mixture was stirred until a solution was achieved. To the solution was added with rapid stirring 4.341 g of the azo-bisanhydride produced in Example I. An exothermic reaction was observed. The reaction was stirred for 2 hours and then allowed to stand overnight. A polymer product having a Gardner viscosity of 5.5 stokes was recovered. This polymer was cast into a brittle film by curing for 30 minutes at 300° F. The film retained the characteristic color.

We claim:

1. A polymer formed by copolymerizing a dianhydride compound of the formula:

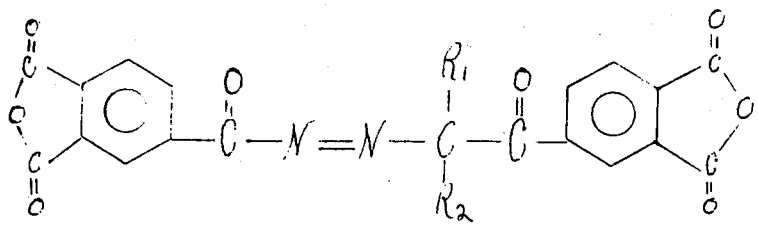

wherein $R_1$ and $R_2$ are independently selected from the group consisting of alkyl radicals containing from one to six carbon atoms, halogenated alkyl radicals containing from one to six carbon atoms, and phenyl radicals; with at least one diamine of up to 20 carbon atoms.

2. The polymer of claim 1 wherein the diamine is 4,4'-diamino-diphenyl ether.

3. The polymer of claim 2 wherein essentially equimolar quantities of said 4,4'-diaminodiphenyl ether and said dianhydride are reacted in an exothermic reaction.

* * * * *